Patented Nov. 29, 1949

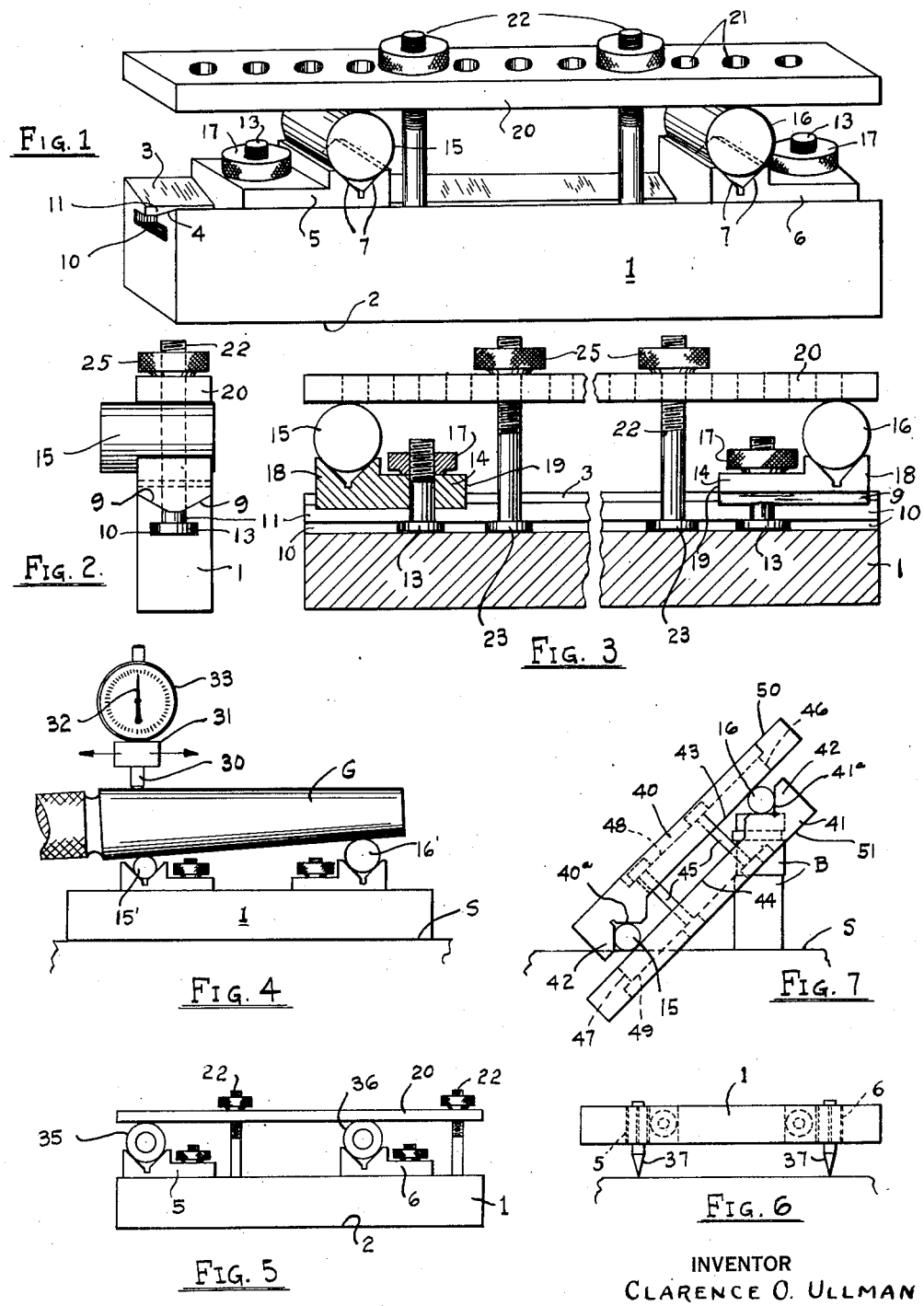

2,489,733

UNITED STATES PATENT OFFICE 2,489,733

PRECISION INSTRUMENT

Clarence O. Ullman, Cleveland, Ohio

Application June 9, 1944, Serial No. 539,490

2 Claims. (Cl. 33—174)

This invention relates to a precision instrument having several practical uses the principal one of which is as an adjustable sine bar.

The principal object is to provide an improved instrument of the kind just mentioned.

A specific object is to provide an instrument useful as a sine bar and in which cylindrical pins or contact elements for engagement with reference surfaces such as surface plates, gage blocks and the like are readily adjustable toward and from each other for considerable distances while remaining a fixed distance from a fiducial surface of the bar and strictly parallel to each other.

A further object is to provide a precision instrument useable as a sine bar in which cylindrical contact pins are demountably and adjustably arranged so as to be readily replaceable with pins of different diameters and other elements such for instance as bushings, trammel points, plug gage members and the like, thus greatly increasing the practical uses of the instrument.

A further object is to provide a sine bar capable of use as a snap gage either for inside dimensions or outside dimensions of parts.

Another object is to provide a sine bar construction enabling angular determination and measurement without the use of gage blocks by substituting different sized cylinders as work or reference surface contact pins.

Other objects and features of the invention will become apparent from the following description with reference to the drawings, in which:

Fig. 1 is an isometric perspective view of the instrument in one form;

Fig. 2 is an end view thereof;

Fig. 3 is a side elevation of the instrument partly broken away in longitudinal central section;

Fig. 4 is a diagrammatic view showing one use of the instrument with a portion of it removed and two different sizes of cylindrical pins in operative position with reference to typical taper work, said view also showing a traveling indicator for checking the degree of taper;

Fig. 5 is a side elevation of the instrument as adapted for determining accurately the location of a hole to be drilled in reference to a previously drilled hole or other reference element—the instrument so adapted being also useable advantageously as a drill jig;

Fig. 6 is a bottom plan view of the instrument when used as a trammel bar; and

Fig. 7 is a side elevation of a modified form of instrument shown as being used in the conventional manner as a sine bar.

Ordinarily, in sine bars, the cylindrical contact pins are fixed to a main elongated substantially rigid bar in such manner that the centers of the two pins are equal distances from a main reference surface of the bar generally referred to as the fiducial surface and the centers of the pins are accurately spaced apart lengthwise of the bar within very small limits comparable to those employed in the making of gage blocks. Longitudinally adjustable sine bars are known but so far as I know these do not utilize cylindrical contact pins or any effective means for enabling movement of such pins toward and away from each other while maintaining the pins in absolute parallelism and fixed relationship to a fiducial reference surface of the sine bar.

In the present arrangement as shown in Fig. 1, the cylindrical pins are movable along the bar or base by reason of being mounted in slidably adjustable V-rests, the pins being removable from their sliding V-rest supports and normally held in proper pressure contact therewith by means of a clamp bar or plate. In the other form shown, Fig. 7, the bar is in two sections, each of which is provided with a fixed rest or support, one for each cylindrical pin, but the two sections are movable lengthwise with reference to each other so that the instrument of Fig. 7 has for most practical purposes the same adjustment capabilities as that of Fig. 1.

Referring first to the form shown in Fig. 1, the base 1 has a main fiducial surface at 2, said surface being absolutely planar and smooth and made generally parallel to paired, relatively intersecting surfaces 3 and 4 forming a centering guide or way. A pair of normally fixed but adjustably movable rests centered on the guideway comprise slidable blocks 5 and 6. The blocks are identical and each has a cross V-support at its top side formed by relatively converging or V-rest surfaces as at 7. The planes of the surfaces 7 meet at an absolute distance from the bottom relatively intersecting surfaces 9 of the blocks which surfaces 9 are complementary to and pressed against the surfaces 3 and 4. Between the surfaces 3 and 4, the base or bar 1 has a central T-slot of conventional form as at 10. The relatively adjacent portions of the surfaces 3 and 4 terminate at the throat portion 11 of the T-slot.

Each of the rest blocks 5 and 6 has suitable means for clamping it on the slide rail surfaces 3 and 4, the clamping means as shown comprising T-head bolts 13, one for each block. The bolts extend through base portions 14 of the blocks and the upper ends of the bolts are threaded to receive knurled cylindrical nuts 17 readily operable by hand to secure uniform pressure of each nut against its associated base. The blocks 5 and 6 can be slid from one end to the other of the base 1 and also reversed in position thereby enabling the cylindrical contact pins 15 and 16 to be set very close together and also set very wide apart, the limits in the latter case being the length of the bar or base 1. The V-supports 7 may, for example, extend outwardly from the base portions 14 in a direction lengthwise of the base as shown by Fig. 3 in order to obtain maximum distance between the pins 15 and 16, or, when it is desired that the pins be relatively close together, then the blocks are reversed and mounted as shown on Fig. 1. The blocks may also be identically positioned, for example as shown on Fig. 5, whenever it is desired that one cylindrical pin or equivalent element be close to or perhaps positioned beyond one end of the bar or base 1 and the other pin at some position intermediate the two ends of the bar or base.

With the construction thus far described the instrument is useable as a conventional sine bar, said uses being well understood in the art. However, the capabilities of the instrument are greatly increased by providing readily removable means to force the cylindrical pins uniformly against their V-supporting surfaces 7. Such forcing means in the form shown in Fig. 1 comprise a clamp bar 20 which, when holding identical diameter pins 15 and 16, is parallel to the base 1. The clamp bar as shown is substantially the same length as the base or bar 1 and is provided at suitable intervals along its longitudinal axis with openings 21. The openings are adapted to receive, interchangeably, identical clamping bolts 22 which pass through the selected openings 21 and into the T-slot 10. The bolts may have T-heads 23 slidably fitting the T-slot. The clamping bolts 22 are provided with suitable nuts 25 for engagement with the clamp bar. The nuts, as shown, are knurled cylinders identical with the nuts 17.

When the rest blocks 5 and 6 occupy positions some distance apart it is then advisable to have the two clamping bolts 22 disposed between said blocks, whereas when the blocks 5 and 6 are set close together then the clamping bolts will be positioned outwardly beyond the two blocks, for example, as suggested at the right on Fig. 5. One bolt 22 only is so shown in Fig. 5. The openings 21 can obviously be modified to comprise a single elongated slot closed (e. g.) at each end so that the bolts 22 could occupy any position between the end limits of the slot. Such construction, however, is unnecessary for full use of the instrument and weakens the clamp bar 20.

Fig. 2 shows a typical mounting of the cylindrical pins 15 and 16, one only being shown, projecting at one end only of the base or bar 1. The uses of the bar for angle determination and measurement and/or orientation of pieces to be measured or formed, as by machining or grinding, is the same as with a conventional sine bar; hence that requires no illustration or description. A few of the special uses of the instrument enabled by the manner of mounting of the cylindrical elements or pins 15 and 16 should, however, be considered.

Fig. 4, for example, shows the manner in which typical tapered members, such for instance as the taper plug gage G, may be supported on cylindrical pin elements 15' and 16' of different accurately measured size so that with the work piece G supported on the two pins its uppermost lengthwise extending surface portion will be parallel to a reference surface S comprising for instance a surface plate or the bed of a traveling feeler 30 on a carriage 31 having a mounting (not shown) strictly parallel to the surface S. The feeler 30 operates the pointer 32 of a dial indicator instrument 33 mounted on the carriage 31 for movement lengthwise of the piece to be checked. When the carriage 31 is moved along the plug gage G the indicator pointer 32 will not move if the taper has been properly formed.

Fig. 5 illustrates another amplification of utility enabled by the manner of mounting the cylindrical elements as shown by the illustrative forms. In Fig. 5 the pins 15 and 16 have been replaced by bushings 35 and 36. The instrument as shown would be useable as a drill jig. This arrangement enables one of two holes to be drilled absolutely accurately a predetermined distance from the other hole. For example, one may insert a close fitting cylindrical pin into one of the bushings, said pin entering a previously drilled hole in the work and, thereupon, by using the other bushing as a guide for the drill, the two holes will be accurately located between centers. In the arrangement according to Fig. 5, a hole to be drilled can be spaced from a reference side surface of the piece either by contact of such side surface with a pin in one of the blocks 5 or 6 or the fiducial surface 2 in cooperation with suitable gage blocks or distance pieces, can be used to determine the distance of the hole from such side surface. Such use of the fiducial surface 2 would be particularly advantageous in the event the side reference surface were raised and perpendicular to the surface in which the hole is to be drilled.

Fig. 6 illustrates the use of the instrument as a trammel bar. In this case both pins 15 and 16 are replaced by trammel points 37 the same being mounted in the blocks 5 and 6 and secured in place accurately measured distances apart by the clamp bar 20 and its associated bolts.

Pin gage elements, e. g., stepped pins for "go" and "no go" plural pin plug gage use of the instrument would be mounted on the base in the same manner as are the pins 15 and 16 or the trammel points 37.

Instead of having to check the distance between centers of the cylindrical pins 15 and 16 or other elements described as by a micrometer or stack of gage blocks—and particularly when the pins are of different diameters—the end surfaces 18 and 19 of the respective blocks are made accurately to within limits comparable to those used on gage blocks from the true centers of the V-rest supports 7 for the pins. Such accurate formation and checking of end surfaces 18 and 19 with reference to the V-centers are done by reference to absolute diameter pins held in the V-rests 7. To check the setting of the instrument it is only necessary, for example, to interpose gage blocks as between the surfaces 19 in the particular relationship of blocks shown by Fig. 3 or to apply a micrometer to both surfaces 18. By that means the actual diameters of the cylindrical rests are rendered immaterial. The distance between centers is the same as in a given setting of the rests, regardless of pin diameter. Thus one does not have to determine the actual diameters of the pins and then subtract or add said diameters or factors thereof from or to the measurement taken in order to establish the distance between the centers of the pins.

The making of the surfaces 18 and 19 as fiducial surfaces also enables use of the instrument as either an inside or outside gage (not illustrated) and in the case of using the blocks as inside gage elements the remotely located surface 18 and/or 19 for contact with the work can be determined or set by means of gage blocks interposed between the two blocks 5 and 6. Since the length of the two blocks is predetermined and absolutely accurate, said blocks function as gage blocks in cooperation with the usual gage blocks or micrometer contact elements.

Referring to the form of the invention shown in Fig. 7 the two bars 40 and 41 there shown are identical, and each has at one end V-notch surfaces identified as 40a and 41a. The V-notches are formed on L-shaped extensions 42 of respective bars 40 and 41, said extensions being oppositely placed endwise of the bars whereby to enable the two bars to be moved lengthwise of each other with the cylindrical pins 15 and 16 maintained in contact with mutually adjacent fiducial surfaces 43 and 44 of respective bars. The bars may be held together and in accurate alignment in any suitable manner—for example by a pair of bolts 45 passing snugly through lengthwise extending slots 46 and 47 (or a series of holes) having counter groove slot portions or recesses 48 and 49 respectively for receiving head and nut portions of bolts 45. Thereby the fiducial opposite surfaces 50 and 51 have no projections. In Fig. 7 the cylindrical pin 15 is shown in contact with a reference surface S (e. g. surface plate) and the pin 16 with the uppermost one of a stack of gage blocks B of proper total height to determine the desired angle in the usual manner of using a sine bar.

I claim:

1. A precision instrument useable as a sine bar and comprising an elongated base having a planar fiducial surface extending lengthwise and laterally thereof, separate means constituting two V-rest notches precisely identical distances from the fiducial surface and adapted for supporting two cylindrical elements in parallel relationship transversely of the base, said latter means being adjustable toward and away from each other lengthwise of the base, and means common to the two cylindrical elements and arranged for connection to the base selectively at different positions therelong and operable to force said elements into uniform contact with the V-rest notches.

2. A precision instrument of the class described, comprising an elongated base having a fiducial surface lengthwise thereof on one side and mutually inwardly overhanging flanges forming an undercut guide extending lengthwise of the base and on the opposite side, a pair of V-blocks slidable along and attachable to the flanges anywhere along the guide with the V-notches extending crosswise of the base and parallel to the fiducial surface, a clamping bar adapted to force cylindrical elements into contact with the V-notch surfaces, and means engaging the clamp bar and undercut surfaces of the guide to force the clamp bar toward the base, said means being selectively disposable for operation anywhere along the guide.

CLARENCE O. ULLMAN.

REFERENCES CITED

The following references are of record in the file of this patent:

UNITED STATES PATENTS

| Number | Name | Date |
| --- | --- | --- |
| 833,917 | Burchardi | Oct. 23, 1906 |
| 1,119,470 | Swantusch | Dec. 1, 1914 |
| 1,231,185 | Muller | June 26, 1917 |
| 1,269,811 | Heritage | June 18, 1918 |
| 1,598,248 | Paine | Aug. 31, 1926 |
| 1,897,774 | Sunnen | Feb. 14, 1933 |
| 2,325,904 | Brebeck | Aug. 3, 1943 |
| D. 137,417 | Baker | Mar. 7, 1944 |

FOREIGN PATENTS

| Number | Country | Date |
| --- | --- | --- |
| 349,467 | Germany | Mar. 3, 1922 |